United States Patent
Ferguson et al.

(10) Patent No.: US 7,398,137 B2
(45) Date of Patent: Jul. 8, 2008

(54) SYSTEM AND METHOD FOR REMOTELY CONTROLLING MACHINE OPERATIONS USING MAPPING INFORMATION

(75) Inventors: Alan Lewis Ferguson, Peoria, IL (US); Trent Ray Meiss, Eureka, IL (US); Brian Lane Jenkins, Washington, IL (US); Steven Wayne O'Neal, Bartonville, IL (US); Daniel Craig Wood, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/924,908

(22) Filed: Aug. 25, 2004

(65) Prior Publication Data

US 2006/0047377 A1     Mar. 2, 2006

(51) Int. Cl.
*G05B 15/00* (2006.01)
*G05D 1/00* (2006.01)
*G06F 19/00* (2006.01)

(52) U.S. Cl. .................... 700/275; 700/2; 701/2; 701/50

(58) Field of Classification Search .......... 701/2, 701/50; 700/2–5, 159, 275
See application file for complete search history.

(56) References Cited

U.S. PATENT DOCUMENTS

| | | | |
|---|---|---|---|
| 5,551,524 A | 9/1996 | Yamamoto et al. | 180/6.62 |
| 5,618,155 A | 4/1997 | Tighe | 414/680 |
| 5,646,844 A | 7/1997 | Gudat et al. | 701/208 |
| 5,712,782 A | 1/1998 | Weigelt et al. | 701/50 |
| 5,995,898 A | 11/1999 | Tuttle | |
| 6,037,901 A * | 3/2000 | Devier et al. | 342/357.17 |
| 6,072,248 A | 6/2000 | Muise et al. | 307/10.2 |
| 6,112,139 A | 8/2000 | Schubert et al. | 701/2 |
| 6,112,152 A | 8/2000 | Tuttle | |
| 6,148,255 A | 11/2000 | van der Lely | 701/50 |
| 6,202,012 B1 | 3/2001 | Gile et al. | 701/48 |
| 6,205,381 B1 | 3/2001 | Motz et al. | 701/25 |
| 6,226,572 B1 | 5/2001 | Tojima et al. | 701/23 |
| 6,249,727 B1 * | 6/2001 | Muller | 701/36 |
| 6,301,514 B1 | 10/2001 | Canada et al. | 700/108 |
| 6,487,375 B2 | 11/2002 | Ferrer et al. | 399/8 |
| 6,522,948 B1 | 2/2003 | Benneweis | 700/243 |
| 6,529,590 B1 | 3/2003 | Centers | |
| 6,587,772 B2 | 7/2003 | Behnke | 701/50 |

(Continued)

FOREIGN PATENT DOCUMENTS

FR     2581006     10/1986

(Continued)

*Primary Examiner*—Ryan A. Jarrett
(74) *Attorney, Agent, or Firm*—Finnegan, Henderson, Farabow, Garrett & Dunner

(57) ABSTRACT

Systems and methods are disclosed that enable one or more work machines to control operations of one or more remote work machines. In one embodiment, the systems and methods perform a process including determining a first type of first work machine performing first operations in a work environment and determining a second type of second work machine performing second operations in the work environment. Based on the first and second type of the first and second work machines, a selected second operation that the first work machine can control is determined. Subsequently, the first work machine may adjust the selected second operation while the first work machine performs the first operations.

24 Claims, 6 Drawing Sheets

| | WM2T1 | WM2T2 | WM3☐T3 |
|---|---|---|---|
| WM1T1 | OP1, OP2, OP3 | OP2, OP3, OP1 | OP1, OP2, OP3 |
| WM1T2 | OP2, OP3, OP4 | OP5, OP6, OP7 | OP4, OP2, OP3 |
| WM1T3 | OP4, OP3, OP1 | OP4, OP5, OP6 | OP1, OP4, OP2 |
| WM1T4 | OP3, OP2, OP1 | OP8, OP9, OP1 | OP3, OP2, OP5 |

402

U.S. PATENT DOCUMENTS

| | | | |
|---|---|---|---|
| 6,600,971 B1 * | 7/2003 | Smith et al. | 700/284 |
| 6,662,881 B2 | 12/2003 | Domann | 172/272 |
| 6,687,571 B1 * | 2/2004 | Byrne et al. | 700/245 |
| 6,804,564 B2 * | 10/2004 | Crispin et al. | 700/79 |
| 2003/0097207 A1 | 5/2003 | Landgraf et al. | 701/2 |
| 2003/0163207 A1 * | 8/2003 | Hurtado et al. | 700/2 |
| 2003/0216139 A1 | 11/2003 | Olson et al. | 455/419 |
| 2005/0005167 A1 * | 1/2005 | Kelly et al. | 713/201 |

FOREIGN PATENT DOCUMENTS

| | | |
|---|---|---|
| JP | 2001-125637 | 5/2001 |

* cited by examiner

|  | WM2T1 | WM2T2 | WM3☐T3 |
|---|---|---|---|
| WM1T1 | OP1, OP2, OP3 | OP2, OP3, OP1 | OP1, OP2, OP3 |
| WM1T2 | OP2, OP3, OP4 | OP5, OP6, OP7 | OP4, OP2, OP3 |
| WM1T3 | OP4, OP3, OP1 | OP4, OP5, OP6 | OP1, OP4, OP2 |
| WM1T4 | OP3, OP2, OP1 | OP8, OP9, OP1 | OP3, OP2, OP5 |

402

SYSTEM AND METHOD FOR REMOTELY CONTROLLING MACHINE OPERATIONS USING MAPPING INFORMATION

TECHNICAL FIELD

The disclosure relates generally to the control of work machines, and more particularly to systems and methods for providing communication and control of the operations of one or more work machines from a remote work machine.

BACKGROUND

An important feature in modern work machines (e.g., fixed and mobile commercial machines, such as construction machines, fixed engine systems, marine-based machines, etc.) is the on-board network and associated machine control modules. An on-board network includes many different modules connected to various types of communication links. These links may be proprietary and non-proprietary, such as manufacturer-based data links and communication paths based on known industry standards (e.g., J1939, RS232, RP 1210, RS-422, RS-485, MODBUS, CAN, etc.). The modules may monitor and/or control one or more components and/or operations of the work machine. The control modules may also receive data from and transmit data to external systems.

Current conventional systems may provide an operating unit that issues commands to a remote construction machine. One such system is disclosed in U.S. Pat. No. 5,551,524 ("the '524 patent"), which discloses a remote control apparatus for a construction machine in which steering control is performed by hydraulically controlling the steering clutches and the steering brakes.

The apparatus includes a remote operating unit for generating a first steering command for turning on or off the steering clutches of the construction machine, and a second steering command for turning on or off the steering brakes of the construction machine. A control unit provided in the construction machine performs a control process that releases the steering clutches while the first steering command is activated. Further, when both the first and second steering commands are activated, hydraulic pressure of the steering brakes is gradually changed from a releasing side to a braking side.

Although the system described in the '524 patent allows for the remote operation of the steering clutches and steering brakes through multiple steering commands, the '524 patent does not disclose selectively defining machine operations that may be remotely controlled from another work machine.

Methods, systems, and articles of manufacture consistent with certain disclosed embodiments may solve one or more of the problems set forth above.

SUMMARY OF THE INVENTION

Systems and methods are provided for remote control of a first work machine from a second work machine. In one embodiment, the system includes a first work machine associated with first work machine identifier information and including mapping information and configured to perform a first set of operations and a second work machine associated with second work machine identifier information and configured to perform a second set of operations. The first work machine determines at least one selected operation from the second set of operations that may be adjusted by the first work machine based on the mapping information and at least one of the first and second work machine identifier information.

In another embodiment, a process is disclosed that includes determining a first type of first work machine performing first operations in a work environment and determining a second type of second work machine performing second operations in the work environment. Based on the first and second type of the first and second work machines, a selected second operation that the first work machine can control is determined. Subsequently, the first work machine may adjust the selected second operation while the first work machine performs the first operations.

In another embodiment, a system in a work machine that performs first operations includes a memory having a data structure storing mapping information that correlates work machine types to operations of work machines of the work machine types. The system may also include a processor configured to receive identifier information from a second work machine reflecting at least a type of the second work machine and configured to analyze the data structure based on the identifier information to determine a selected operation of the second work machine that the first work machine is authorized to control. The first work machine controls the selected operation of the second work machine while performing the first operations.

BRIEF DESCRIPTION OF THE DRAWINGS

The accompanying drawings, which are incorporated in and constitute a part of this specification, illustrate several embodiments and together with the description, serve to explain the principles of the disclosed communication system. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
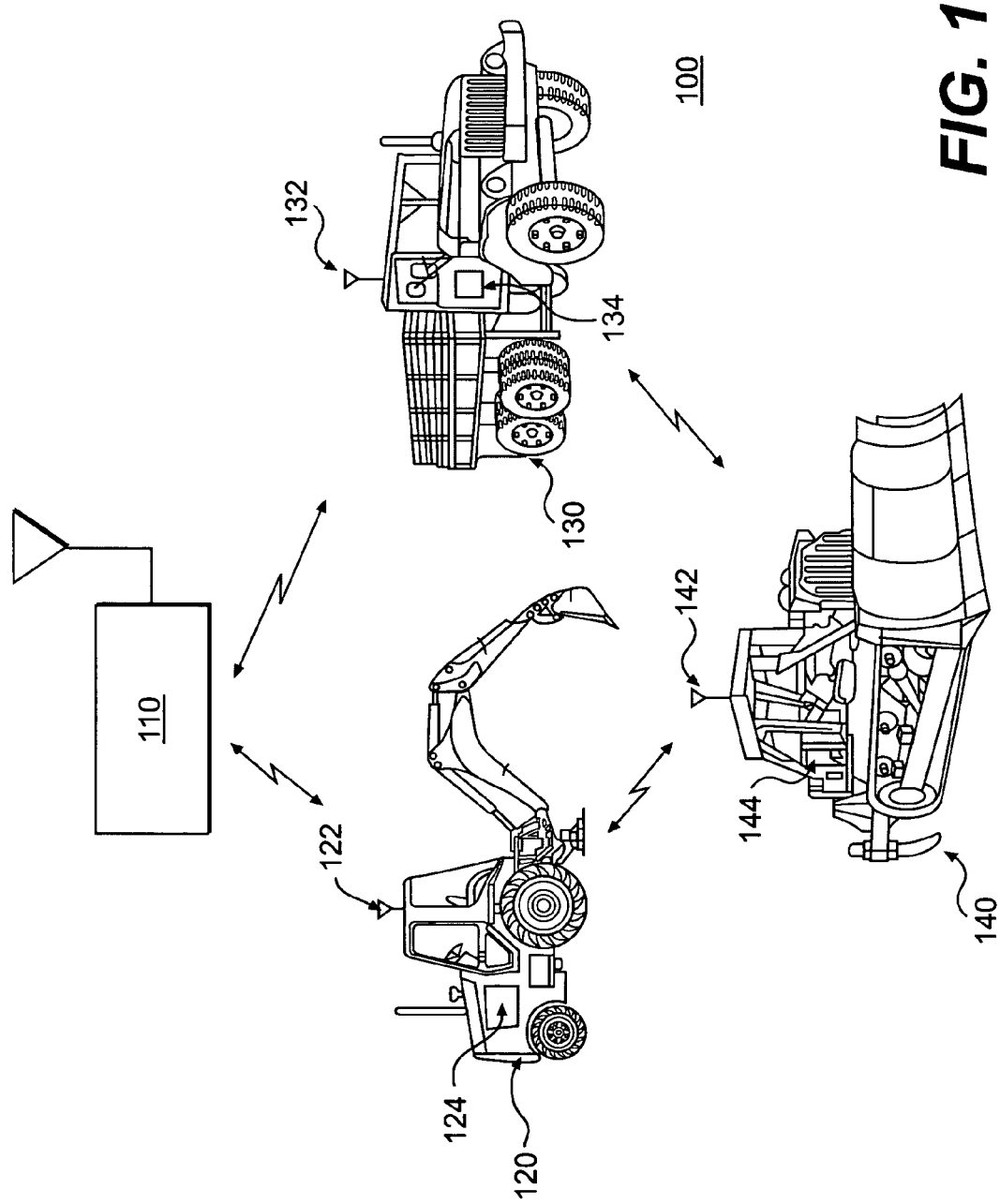
FIG. 1 illustrates a diagrammatic diagram of an exemplary work machine environment consistent with certain disclosed embodiments.

FIG. 1 illustrates an exemplary work machine environment 100 in which features and principles consistent with certain disclosed embodiments may be implemented. As shown in FIG. 1, work machine environment 100 may include a remote off-board system 110 and work machines 120, 130, and 140. Each work machine 120, 130, and 140 includes a wireless communication device, such as antennae 122, 132, and 142, and an on-board system 124, 134, and 144, respectively. Although only a specific number of work machines are shown, environment 100 may include any number and types of such machines and/or off-board systems.

Work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, work machine 120 is a backhoe type work machine, work machine 130 is a hauler-type work machine, and work machine 140 is an earth moving type work machine. The types of work machine illustrated in FIG. 1 are exemplary and not intended to be limiting. It is contemplated by the disclosed embodiments that environment 100 may implement any number of different types of work machines.

An off-board system, as the term is used herein, may represent a system that is located remote from work machines 120, 130, and 140. An off-board system may be a system that connects to work machine 120 through wireline or wireless data links. Further, an off-board system may be a computer system including known computing components, such as one or more processors, software, display, and interface devices that operate collectively to perform one or more processes. Alternatively, or additionally, an off-board system may include one or more communication devices that facilitate the transmission of data to and from work machine 120. In certain embodiments, an off-board system may be another work machine remotely located from work machine 120.

Remote off-board system 110 may represent one or more computing systems associated with a business entity corresponding to work machines 120, 130, and 140, such as a manufacturer, dealer, retailer, owner, project site manager, a department of a business entity (e.g., service center, operations support center, logistics center, etc.), or any other type of entity that generates, maintains, sends, and/or receives information associated with machines 120, 130, and 140. Remote off-board system 110 may include one or more computer systems, such as a workstation, personal digital assistant, laptop, mainframe, etc. Remote off-board system 110 may include Web browser software that requests and receives data from a server when executed by a processor and displays content to a user operating the system. In one embodiment of the disclosure, remote off-board system 110 is connected to work machine 120 through a local wireless communication device. Remote off-board system 110 may also represent one or more portable, or fixed, service systems that perform diagnostics and/or service operations that include receiving and sending messages to work machine 120. For example, remote off-board system 110 may be an electronic testing device that connects to work machine through an RS-232 serial data link or through wireless communication mediums.

Wireless communication devices 122, 132, and 142 may represent one or more wireless antennae configured to send and/or receive wireless communications to and/or from remote systems, such as off-board system 110 and other work machines. Although devices 122, 132, 142 are shown being configured for wireless communications, other forms of communications are contemplated. For example, work machines 120, 130, and 140 may exchange information with remote systems using any type of wireless, wireline, and/or combination of wireless and wireline communication networks and infrastructures. As shown in FIG. 1, work machine 120 may wirelessly exchange information with work machines 130 and 140, and off-board system 110. Further, work machines 130 and 140 may exchange information with off-board system 110 and work machine 120.

Figure 2:
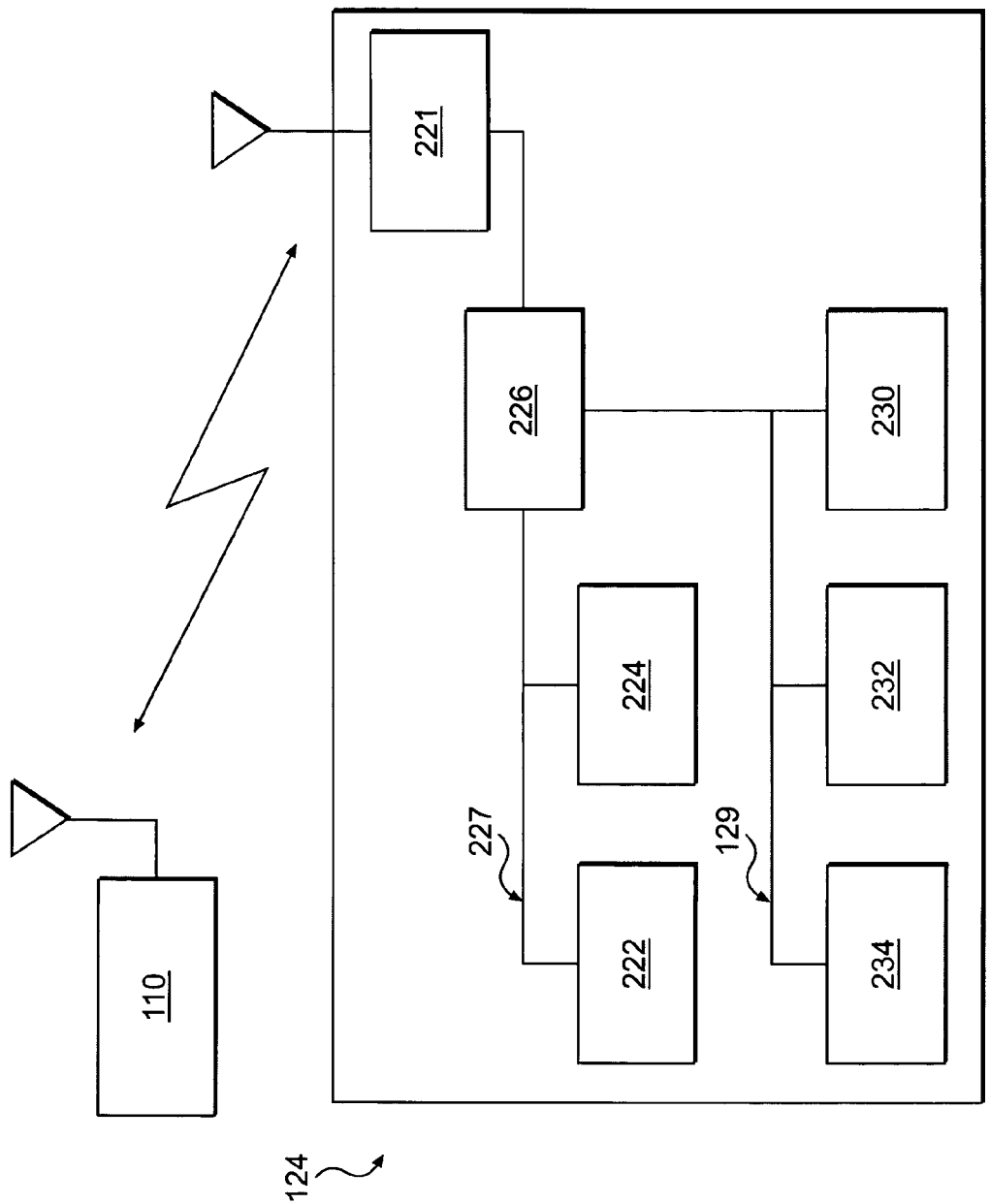
FIG. 2 illustrates a block diagram of an on-board system consistent with certain disclosed embodiments.

On-board systems 124, 134, and 144 may represent a system of one or more on-board modules, interface systems, data links, and other types of components that perform machine processes within work machines 120, 130, and 140. FIG. 2 shows a block diagram of on-board system 124 consistent with certain disclosed embodiments. The following description of on-board system 124 is applicable to on-board systems 134 and 144.

As shown in FIG. 2, on-board system 124 may include a communication module 221, an interface control system 226, and on-board modules 222, 224, 230, 232, and 234, respectively connected to primary and secondary on-board data links 227 and 229. Although interface control system 226 is shown as a separate entity, some embodiments may allow control system 226 to be included as a functional component of one or more of the on-board modules. Further, although only a specific number of on-board control modules are shown, system 124 may include any number of such modules.

An on-board module, as the term is used herein, may represent any type of component operating in a work machine that controls or is controlled by other components or sub-components. For example, an on-board module may be an operator display device, an Engine Control Module (ECM), a power system control module, a Global Positioning System (GPS) interface device, an attachment interface that connects one or more sub-components, and any other type of device that work machine 120 may implement to facilitate operations of the machine during run time or non-run time conditions (i.e., machine engine running or not running, respectively).

Communication module 221 represents one or more devices that is configured to facilitate communications between work machine 120 and an off-board system, such as remote off-board system 110. Communication module 221 may include hardware and/or software that enables the module to send and/or receive data messages through wireline or wireless communications. Communication module 221 may also include one or more wireless antennae for facilitating wireless communications with remote off-board system 110, although other off-board systems may send and receive data messages to and from communication module 221. The wireless communications may include satellite, cellular, infrared, and any other type of wireless communication that enables work machine 120 to wirelessly exchange information with an off-board system.

Modules 222 and 224 represent one or more on-board modules connected to a primary data link 227 included in work machine 120. Primary data link may represent a proprietary or non-proprietary data link, such as Society of Automotive Engineers (SAE) standard data link including Controller Area Network (CAN), J1939, etc. Primary data link 227 may be wireless or wired. For example, in one embodiment, work machine 120 may include wireless sensors that are linked together through interface control system 226. The term "primary data link" is not intended to be limiting. That is, "primary" refers to a data link for designation purposes only, and does not infer primary functionality associated with the data link or any on-board modules connected to the primary data link. However, certain embodiments may arrange on-board modules on specified data links that have different work machine importance in terms of functionality than other on-board modules.

Modules 230, 232, and 234 represent on-board modules connected to a secondary data link 229 within work machine 120. Secondary data link 229 may be a proprietary or non-proprietary data link. Further, secondary data link 229 may be wireless or wired. The term "secondary data link" is not intended to be limiting. That is, "secondary" refers to a data link for designation purposes only, and does not infer secondary functionality associated with the data link or any on-board modules connected to the secondary data link. However, certain embodiments may arrange on-board modules and interface control system 226 on specified data links that have different work machine importance in terms of functionality than other on-board modules.

On-board modules 222, 224, 230, 232, and 234 may include one or more processing devices and memory devices for storing data executed by the processing devices (all not shown). In one embodiment, on-board modules 222, 224, 230, 232, and 234 may include software that is stored in a rewritable memory device, such as a flash memory. The software may be used by a processing device to control a particular component of work machine 120, such as an engine component. In certain embodiments, the software is modifiable through commands received by the processing devices over respective data links 227 and 229.

Interface control system 226 represents an on-board interface device configured to perform functions consistent with embodiments of the work machine. Interface control system 226 may be configured with various types of hardware and software depending on its application within work machine 120. Thus, in accordance with certain embodiments, interface control system 226 may provide interface capability that facilitates the transmission of data to and from communication module 221 and on-board modules 222, 224, 230, 232, and 234. Further, interface control system 226 performs various data processing functions and maintains data for use by one or more on-board modules or off-board systems. For example, interface control system 226 may be configured to perform protocol conversions (e.g., tunneling and translations) and message routing services for on-board data links.

For clarity of explanation, FIG. 2 depicts interface control system 226 as a distinct element. However, interface control functionality may be implemented via software, hardware, and/or firmware within one or more modules (e.g., 222 and 224) on an on-board data link. Thus, interface control system 226 may, in certain embodiments, represent functionality or logic embedded within another element of work machine 120.

In one embodiment, interface control system 226 may include various computing components used to perform certain functions consistent with the requirements of that embodiment. To do so, interface control system 226 may include one or more processors and memory devices. For example, interface control system 226 may include a digital core that includes the logic and processing components used by interface control system 226 to perform interface, communications, software update functionalities, and software driver selection. In one embodiment, the digital core may include one or more processors and internal memories. The memories may represent one or more devices that temporarily store data, instructions, and executable code, or any combination thereof, used by a processor. Further, the memories may represent one or more memory devices that store data temporarily during operation of interface control system 226, such as a cache memory, register device, buffer, queuing memory device, and any type of memory device that maintains information. The internal memory used by interface control system 226 may be any type of memory device, such as flash memory, Static Random Access Memory (SRAM), and battery backed non-volatile memory devices.

In operation, the digital core may execute program code to facilitate communications between on-board modules and/or off-board systems. In one embodiment, interface control system 226 may include software that performs protocol conversion operations for converting information associated with one type of data link to another. The conversion operations may include protocol translation and tunneling features.

Figure 3:
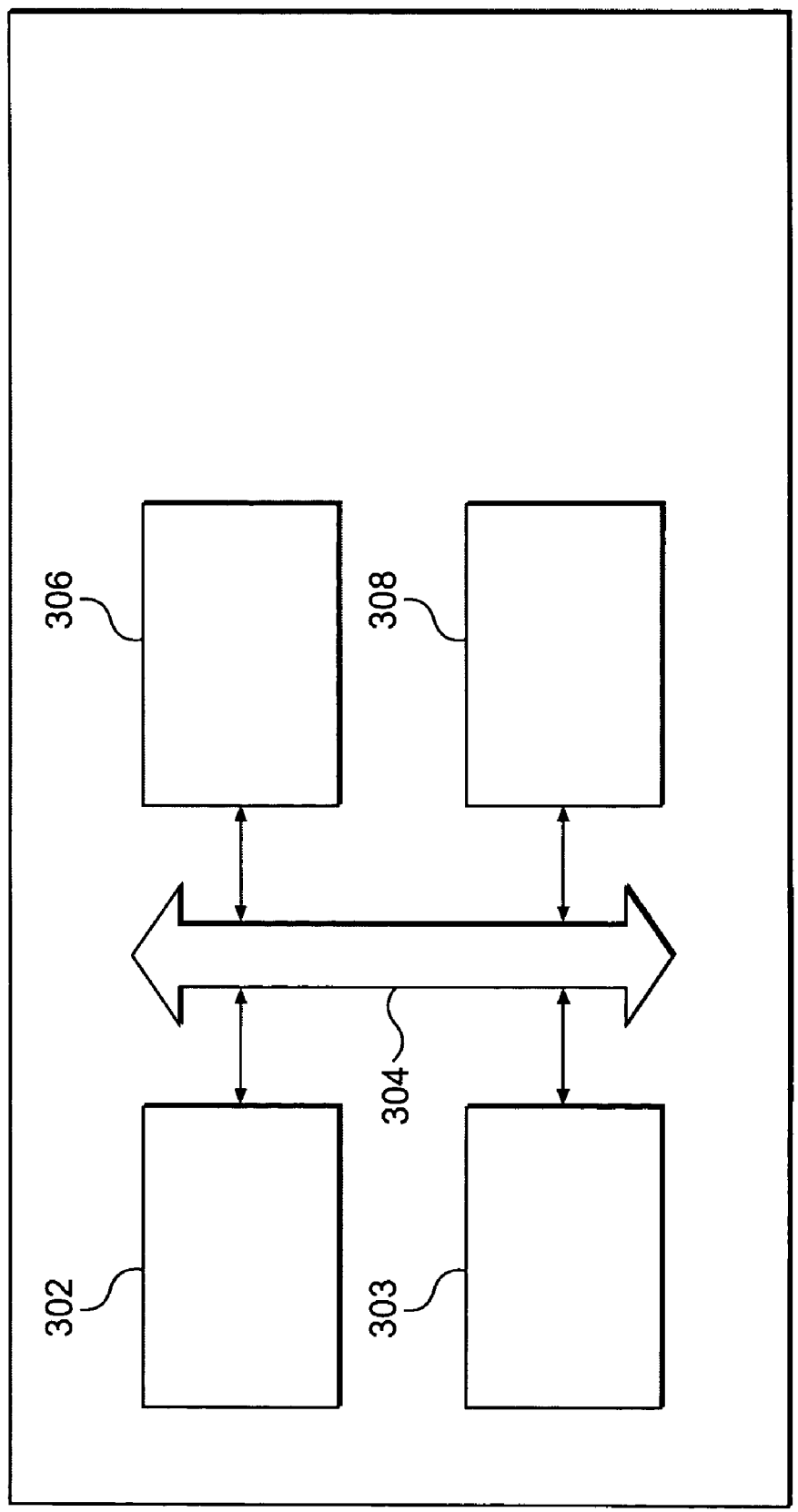
FIG. 3 illustrates a block diagram of exemplary components of the interface control system consistent with certain disclosed embodiments.

In one embodiment, as shown in FIG. 3, interface control system 226 may include conventional components such as a processor 302, a memory 303 (e.g. RAM), and a bus 304, which couples processor 302 and memory 303 to a storage system 306 and communication interface 308. Storage system 306 may include one or more memory devices (e.g. RAM, ROM, NV RAM, magnetic disks, optical storage disks, etc.). Additionally, storage system 306 may include memory controller components, such as an I/O controller that facilitates access to and from storage system 306. In one embodiment, storage system 306 may store work machine and operator profile information associated with its respective work machine and other remote work machines. This information may be accessed by processor 302 to perform one or more processes consistent with certain disclosed embodiments.

Communication interface 308 may be one or more interface components (e.g., software, hardware, or a combination thereof) that transmits and receives information from and to interface control system 226. The above description of interface control system 226 is not intended to be limiting, as other configurations and components may be implemented.

In addition to performing information transfer between on-board data links 227, 229 and off-board data links (e.g., wireless networks), interface control system 226 may be configured to perform one or more remote work machine control process consistent with certain disclosed embodiments. For example, interface control system 226 may allow a first work machine (e.g., work machine 120) to provide communications and remote control of one or more second work machines (e.g., work machine 130). Further, interface control system 226 may be configured to accept and process remote communication and control data received from one or more remote work machines. Although work machines 120 and 130 are mentioned above, it is important to note that because each work machine (e.g., 120, 130, and 140) may include an interface control system 226, any one of these machine may control one or more work machines in a manner consistent with the disclosed embodiments.

For instance, processor 302 of interface control system 226 may be configured to communicate work machine identifier information ("identifier information") to remote work machines and/or off-board system 110. The work machine identifier information may include data reflecting a work machine's unique identifier, work machine type, operator information (e.g., current operator identifiers, past operator information, etc.) and other forms of profile information related to a given work machine. When sending identifier information, processor 302 may transfer its respective work machine identifier to communication interface 308 for subsequent transmission to a remote machine, such as work machine 130.

In addition to communicating identifier information, processor 302 may also be configured to receive identifier information associated with a remote work machine (e.g., machine 130). When receiving identifier information, communication interface 308 may receive the information from communication module 221 and transfer it to memory 303 for access by processor 302. Following receipt of this information, processor 302 may analyze the data against mapping information stored in a memory device, such as storage system 306. The mapping information may define a relationship between the profile information included in the work machine identifier information and any other type of profile information that may be stored in the storage device (e.g., such as other work machine identifiers, other work machine operator profile information, etc.).

Based on the analysis, processor 302, through execution of a computer process, may identify one or more functions and/or operations of the respective work machine 120 that may be adjusted and controlled from other work machines. Additionally, or alternatively, the analysis performed by processor 302 may also result in identifying one or more functions and/or operations of one or more remote work machines that may be adjusted or controlled from the respective work machine. The mapping information used and analyzed by work machines 120, 130, and 140 may include work machine parameter data that reflects one or more respective operations and/or functions of a work machine. For instance, a first parameter may reflect values of current engine speed, while a second parameter may reflect temperature or fluid levels of a given component or liquid.

Figures 4A, 4B:
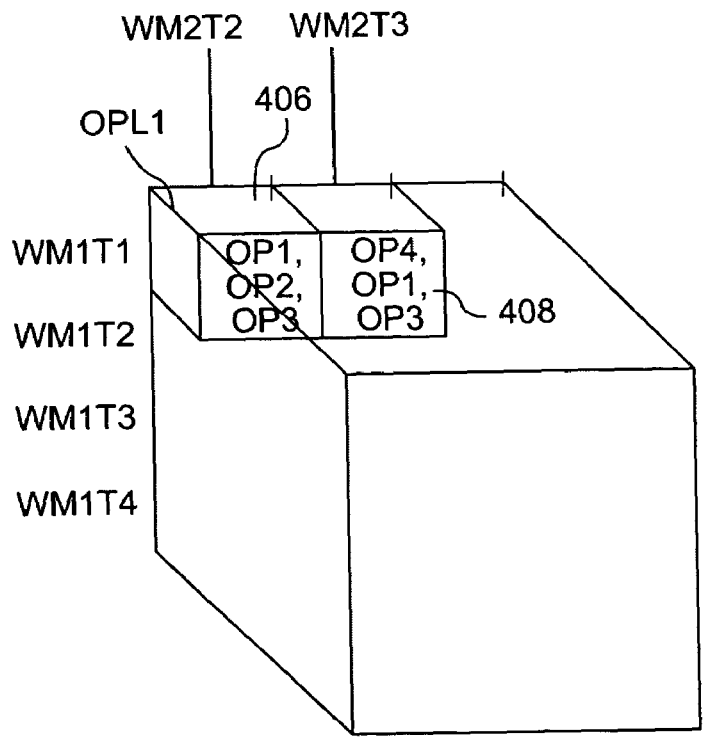
FIG. 4A illustrates an exemplary database structure for work machine mapping information consistent with certain disclosed embodiments.
FIG. 4B illustrates an exemplary database structure for work machine mapping information consistent with certain disclosed embodiments.

In one embodiment, the mapping information may define a relationship or correlation between a work machine identifier and certain work machine type data. A work machine type may be a representation of a particular type of machine and may also be associated with certain operations that the given machine is configured to perform. For example, FIG. 4A illustrates an exemplary database structure reflecting work machine mapping information based on work machine type data. The database structure shown in FIG. 4A may be stored in a memory device within interface control system 226, such as memory system 306.

As shown in FIG. 4A, a work machine type value (WM#T#) for each work machine is indexed and is associated with various types of work machine operations (OP#) that may be performed by the work machine. Based on the machine types, interface control system 226 determines the operations (OP#) of a first work machine that may be controlled from a second work machine. The work machine mapping information stored on a given work machine may correlate a first work machine type to a second work machine type in order to identify those operations of the first work machine (e.g. work machine 120) that may be controlled from the second work machine (e.g., work machine 130).

To better illustrate the above described embodiments, consider the scenario where work machine 120 is a first type work machine WM1T3 (e.g., shovel type work machine) and work machine 130 is second type of work machine WM2T2 (e.g., hauler type machine). Because each work machine may perform different types of operations, the mapping information may identify predetermined or dynamically determined operations that may be adjusted and/or controlled by certain types of work machines.

For instance, cell 402 in the database structure shown in FIG. 4A includes the mapping relationship between work machines of a first type and a second type (i.e., WM1T3 and WM2T2, respectively). As shown, cell 402 indicates that the first work machine type (i.e., WM1T3) may control selected operations of work machines of the second type (i.e., WM2T2), such as operations OP4, OP5, and OP6. This may include operations such as engine speed, engine power, brakes, and steering, as well as other physical operations. It should be noted that although the above example describes a one-way relationship between the mapping information included in each cell of the database structure (i.e., WM1T3 controlling operations OP4, OP5, and OP6 of WM2T2), two-way operation mapping data may be included in each cell. That is, cell 402 may include operations of WM1T3 that may be controlled by WM2T2. Accordingly, embodiments may implement other forms of mapping data and configurations within the database structure of FIG. 4A to allow work machines to selectively determine one or more remote work machine operations to monitor and/or control.

In another embodiment, operator profile data may be used in conjunction with work machine types to determine the work machine operations that may be controlled by a remote work machine. For example, operator identifier data associated with an experience level of an operator for certain types of machines may be used to determine the type of operations a machine may control. To determine the experience level of an operator, one or more identification technologies may be used to identify a machine operator. For example, a radio frequency device (e.g., an RFID tag) may be used to identify an operator that is performing tasks with a given work machine. The radio frequency device (not shown) may consist of a chip attached to an antenna. A scanner positioned in the work machine may be used to scan the chip to direct the chip to emit a radio frequency signal transmitting the operator's unique personal identification number. The operator identification number may be used by on-board system 124 to identify the operator and determine the operator's associated experience level through operator profile mapping information stored in a memory device.

Additionally, or alternatively, on-board system 124 may include components for receiving an operator identification code. Such components may include, for example, a switch or similar device (not shown), configured to receive key data from a key device (e.g., smart card, smart key, etc.) having operator identification data stored therein. Based on the operator identification data, on-board system 124 may be configured to determine the experience level of the identified operator.

In the above embodiments, selected operations of a first work machine (e.g., work machine 120) that may be controlled or adjusted by a second work machine (e.g., work machine 130) may be mapped in a multi-dimensional matrix using the experience level of the operator of the first work machine and the work machine types. FIG. 4B illustrates an exemplary database structure for storing an exemplary multi-dimensional matrix.

In FIG. 4B, the operations of a first work machine are indexed based on the experience level of an operator of the first work machine (OPL), the first work machine type (WM#T#), and a second work machine type (WM#T#). For example, selected operations of the first work machine (e.g., OP1, OP2, and OP3) may be indexed in cell 406 based on the operator level of experience (OPL1), the first machine work type (WM1T1), and the second work machine type (WM2T2). In similar fashion, the operations of the first work machine (e.g., OP4, OP1, and OP3) may be indexed in cell 408 based on the operator experience level (OPL1), the first work machine type (WM1T1), and the second work machine type (WM2T3). Accordingly, certain types of work machines that are operated by certain types of operators may control selected operations of certain other types of work machines operated by certain other types of operators.

FIGS. 4A and 4B are non-limiting exemplary database structures that may be implemented by the disclosed embodiments. Although the database structure shown in FIGS. 4A and 4B are shown as single arrays or structures, it is contemplated that these database structures may be formed from multiple linked storage arrays that include references to other memory locations or devices. Further, other structures may be used to store and present the operations of a work machine that may be controlled from another machine. For example, a multiple dimensional database structure may be used in which the experience level of one or more operators and the work machine types of one or more work machines are used to determine the operations of one work machine that may be controlled from one or more other work machines.

In yet a further embodiment, work machines (e.g., work machine 120, 130, and 140) may receive mapping information from other work machines and/or off-board system 100. For example, work machines 120, 130, and/or 140 may transmit work machine identifier information to off-board system 110. Based on the respective work machine identifier received from the given work machine, off-board system 110 may determine the appropriate mapping information for a given work machine and transmit the work machine mapping information to the work machine. Alternatively, off-board system 110 may generate mapping information without receiving a request or information from work machines 120, 130, and 140. Instead, off-board system may, either through user input or computer process input or request, generate mapping information for each of the work machines in a given work environment based on previously stored profile information for these machines and, possibly, the operators operating these machines in the environment. Off-board system 110 may download the mapping information to work machines 120, 130, and 140 periodically, on-demand by a user or computer process, in response to a request from one or more work machines, or by any other type of initiating action.

Figure 5:
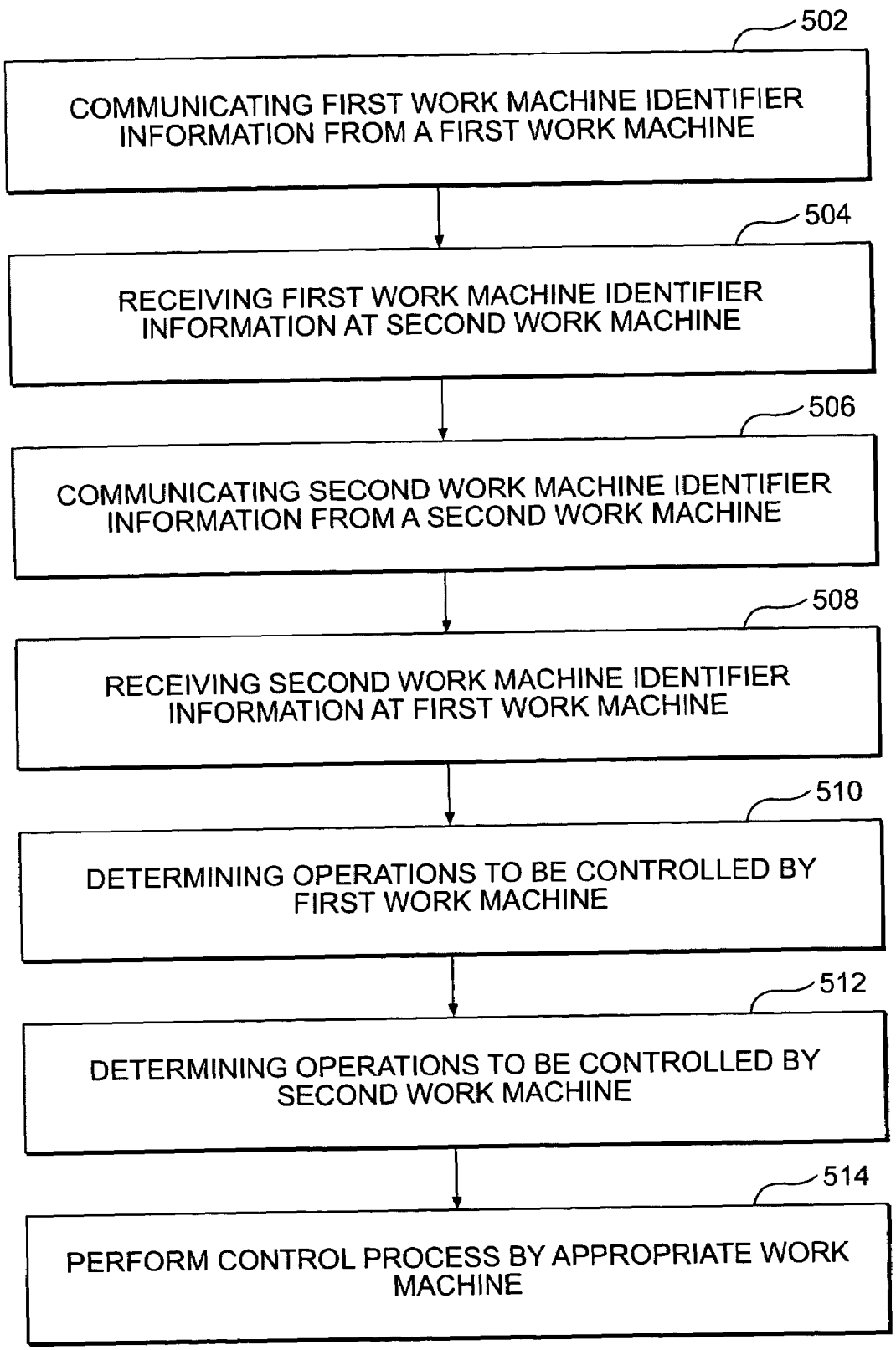
FIG. 5 illustrates a flowchart of an exemplary process for providing communications and remote control of work machines consistent with certain disclosed embodiments.

As explained, work machines 120, 130, and 140 may be equipped with an on-board system 124, 134, and 144, respectively that is configured to control selected remote work machine operations. FIG. 5 shows a flowchart of an exemplary control process 500 that may be performed by any of on-board systems 124, 134, and 144 for providing communications and remote control of remote work machines in a work environment.

During operations, work machines 120, 130, and 140 may perform tasks individually or collectively to perform a work environment task, such as removing earth from some specific terrain location. To better illustrate this embodiment, process 500 is described in the context of a road repaving environment where one type of work machine removes existing asphalt from a road surface and another type of work machine collects the removed asphalt ejected from the first machine. Thus, for example, work machine 120 in FIG. 1 may be a first type of work machine that removes the asphalt and work machine 130 may be a second type of work machine that collects and hauls the ejected asphalt from work machine 120.

During work environment operations, the two types of work machines may travel within a certain range of each other, and even work in tandem to perform a particular work environment task, such as removing asphalt and collecting it in a hauling machine for off site delivery. Accordingly, at some point in time, a first work machine (e.g., machine 120) may generate and provide first work machine identifier information including data reflecting its machine type, a unique machine identifier, available operations that may be performed, and/or operator profile information (Step 502). Other machine information may be included in the identifier information, such as operation parameter types, threshold values (e.g., RPM limits, etc.). The first work machine identifier information may be sent off board and received by a second work machine (Step 504). At the same time, or at a different time, the second work machine may communicate second work machine identifier information associated with the second work machine off board (Step 506). The second work machine identifier information may be received by the first work machine (Step 508). Typically, the two work machines may send and receive the identifier information through a wireless network and each machine's respective communication module (e.g., communication module 221) although other forms of communications can be implemented to exchange information between the work machines.

Upon receiving the second work machine identifier information, the first work machine may allow its interface control system 226 to filter the data included in the information and perform an analysis process to determine one or more second work machine operations that may be controlled by the first work machine (Step 510). Along the same lines, the second work machine may allow its interface control system 226 to filter the data included in the first machine identifier information and perform an analysis process to determine one or more first work machine operations that may be controlled by the first work machine (Step 512). It should be noted that there may be situations where one work machine is not configured to control another work machine. For example, in the road removal scenario described above, the hauling type work machine may not be allowed to control the operations of the road removal machine, while the road removal machine may control selected operations of the hauling machine.

Steps 510 and 512 of process 500 may include processes performed by interface control system 226 for each respective work machine. These processes may include accessing a data structure to analyze mapping information to determine the operations of a remote machine that may be controlled based on, for example, the types of work machines included in the analysis, the operator profile data (e.g., experience levels, authorization levels, etc.), and safety threshold data based on the type of work environment and tasks being performed in the work environment.

Once the appropriate machine operations are determined by each respective work machine, a control process is performed by an appropriate work machine with authorization to control selected operations of the other machine (Step 514). In one embodiment, the control process may include sending parameter values to the other work machine that cause the selected operations of that machine to be adjusted and/or controlled. For example, the first work machine (e.g., road removal machine) in the above hypothetical scenario may sense that the second work machine (e.g., hauler machine) is traveling too far from an ejection mechanism of the removal machine. Accordingly, the first work machine may send engine speed or ground speed parameter data and associated commands through its wireless communication module 221 to the second work machine to direct the second work machine's interface control system to adjust the speed of the second machine.

In another embodiment, safety or threshold values may be monitored by each machine as it is being controlled by a work machine. Therefore, if a first work machine attempts to adjust the operations of a second machine that would cause or does cause the second machine to operate at levels that are predetermined to be unsafe or may damage the machine, the commands may be overridden by a monitoring process performed by the second machine's interface control system. Examples of unsafe operations may include operations that cause the second machine to exceed a ground speed that is prohibited by off-board system 110 personnel or work environment standards. An exemplary damaging operation may be one that causes the second work machine to raise its engine speed above specification limits. Other types of operations may be monitored to prevent damage or unsafe operating conditions and the disclosed embodiments are not limited to the above examples. Accordingly, the monitoring process may prevent any damage or unsafe operations by ensuring only authorized operations are controlled within predetermined parameter limits.

As described above, as work machines 120, 130, and 140 perform tasks within a work environment, interface control systems 226 for each machine may allow one or more machines to be controlled by one or more other work machines through the analysis of the mapping information stored within each machine. There may, however, be instances where one or more work machines may not include appropriate mapping information to be analyzed (or may not include any mapping information). Accordingly, in accordance with certain embodiments, these machines may request the mapping information from off-board system 110 and/or other work machines.

Figure 6:
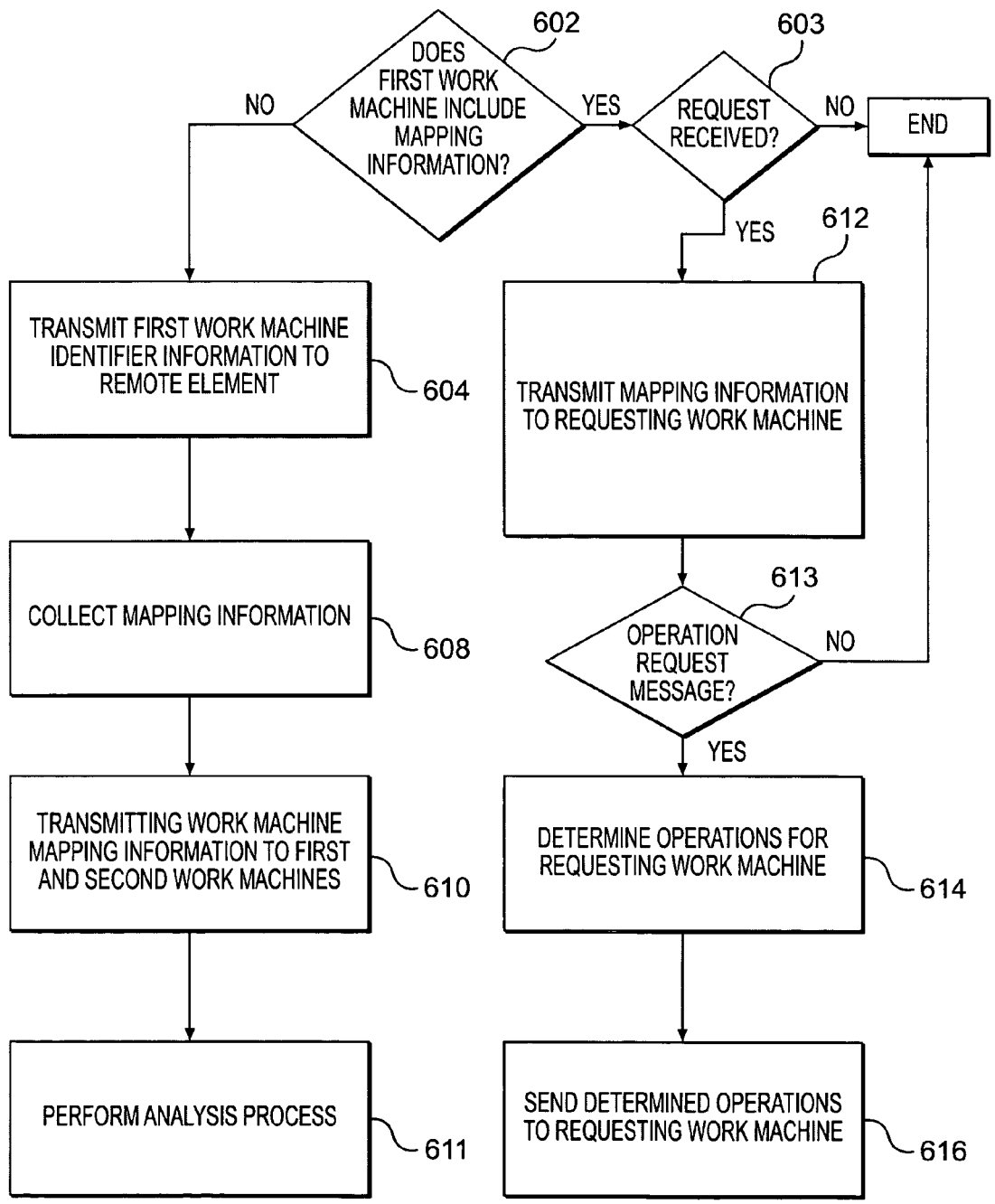
FIG. 6 illustrates a flow chart of an exemplary mapping information collection process consistent with certain disclosed embodiments.

FIG. 6 shows a flow chart for an exemplary mapping information collection process 600 consistent with certain disclosed embodiments. During operations, a first work machine may attempt to determine remote work machine operations that may be controlled in a manner as described in the control process described above in connection with FIG. 5. Prior to, or during, the operation determining processes, the first work machine may determine whether it includes mapping information used to determine the selected operations (Step 602). If the first work machine mapping information is not included in the first work machine (Step 602, No), the first work machine may generate a request message for the mapping information. The request message may include first work machine identifier information. Once generated, the first work machine may transmit the request message to a remote element in an attempt to receive the mapping information (Step 604).

In one embodiment, the request message may be sent to off-board system 110. Alternatively, or additionally, the first work machine may send the request message to a remote work machine. In the later case, the remote work machine may determine if it also includes the mapping information. If not, the remote machine sends a response message to the first work machine indicating it does not have the mapping information. If the remote machine does include the mapping information, process 600 continues at Step 608.

In the event the first work machine sends the request message to off-board system 110 or that the remote work machine does have the mapping information, the remote element may collect the mapping information in response to the request message (Step 608). Once collected, the remote element may send the mapping information to the first work machine (Step 610). Subsequently, the first work machine may store the mapping information in a memory device, such as memory system 306, and perform its analysis process to determine the selected second work machine operations the first work machine may control in a manner consistent with that described above in connection with FIG. 5 (Step 611).

Returning to Step 602, in the event the first work machine does include the mapping information, it may perform the same analysis process to determine the selected operations that the machine may control. At some point, the first work machine determines whether it has received a request message for mapping information from a requesting work machine (Step 603). If not (Step 603, No), process 600 may end. On the other hand, if a request message is received (Step 603, Yes), the first work machine may create a copy of the mapping information and send the copy to the requesting work machine (Step 612).

In another embodiment, in addition to, or alternatively to requesting mapping information, the requesting work machine may send an operation request message to the first work machine (Step 613). An operation request message may be a request for the first work machine to perform an analysis process for the requesting machine to determine the operations it may control for an identified work machine remote to the requesting machine. The operation request message may include work machine identifier information for the requesting machine and the identified work machine. The identified work machine may include the first work machine or may be a different work machine.

If an operation request message is not received (Step 613, No), process 600 ends. If, however, an operation request message is received (Step 613, Yes), the first work machine performs an analysis process on the mapping information to determine the selected identified work machine operations the requesting work machine may control based on, for example, the identifier information associated with the requesting and identified work machines (Step 614). For example, the first work machine may determine the selected operations based on the type of the requesting and identified work machines, operator profile data for each of these machines, etc. Once determined, the first work machine may send the selected operations to the requesting work machine for subsequent use by that machine (Step 616).

Although not described in FIG. 6, it should be noted that the first work machine may also generate and send operation request messages to other work machines and/or off-board system 110 to allow these remote elements to identify those operations the first work machine may control for an identified machine. In response to the first work machine's operation request message, it may receive selected operations that the first work machine may control for the identified work machine and subsequently perform control processes for controlling or adjusting operations of the identified work machine.

INDUSTRIAL APPLICABILITY

Methods and systems consistent with the disclosed embodiments enable a work machine to control or adjust the operations of a remote work machine. Further, these embodiments enable the work machine to be controlled or have its operations adjusted by a remote work machine. Further, utilizing the disclosed methods and systems, it may be possible for a work machine to control the operations of multiple work machines and/or have one or more work machines control the operations of that work machine. To facilitate the control processes performed by the disclosed embodiments, work machines may exchange work machine identifier information that is used to determine the selected operations a given work machine may control or adjust. The selected operations may be determined by analyzing the identifier information against mapping information that is stored in one or more of the work machines and in an off-board system.

In certain disclosed embodiments, the mapping information may be stored in a multi-dimensional storage array that is indexed by work machine types, operator profile information, and any other form of work machine or operator profile information. Accordingly, operations or functions of a work machine may be indexed based on the experience or authorization levels of the operators of the machines. In addition to a multi-dimensional array, other structures may be implemented to store the operations of a work machine that may be controlled from another machine.

Other embodiments, features, aspects, and principles of the disclosed exemplary systems may be implemented in various environments and are not limited to work site environment. For example, a work machine having the features of the disclosed system may perform the functions described herein in other environments, such as mobile environments between job sites, geographic locations, and settings. Further, the processes disclosed herein are not inherently related to any particular system and may be implemented by a suitable combination of electrical-based components. Embodiments other than those expressly described herein will be apparent to those skilled in the art from consideration of the specification and practice of the disclosed systems. It is intended that the specification and examples be considered as exemplary only, with the true scope of the invention being indicated by the following claims.

What is claimed is:

1. A system for performing remote controlled operations between machines, comprising:
   a first machine associated with first machine identifier information and including mapping information, the first machine configured to perform a first set of physical operations; and
   a second machine associated with second machine identifier information and configured to perform a second set of physical operations,
   wherein the mapping information includes the first machine identifier information and the second machine identifier information, and defines a control relationship between the first machine and one or more physical operations of the second machine,
   and wherein the first machine is configured to:
      determine, based on the mapping information, at least one selected physical operation from the second set of physical operations that may be adjusted by the first machine, and
      adjust the at least one selected physical operation of the second machine based on the determination.

2. The system of claim 1, wherein the at least one selected physical operation is determined based on at least one of:
   a type of the first machine,
   a type of the second machine,
   an operator profile associated with a first operator of the first machine, and
   an operator profile associated with a second operator of the second machine.

3. The system of claim 1, wherein the mapping information includes one or more of the first and second set of physical operations that is indexed based on data included in the first and second machine identifier information.

4. The system of claim 1, wherein the first and second machine identifier information includes data reflecting a type of the first and second machines, respectively.

5. The system of claim 4, wherein the mapping information correlates machine types, an experience level for an operator of the second machine, an experience level for an operator of the first machine, and at least one of the first and second set of physical operations.

6. The system of claim 5, wherein the first machine determines the at least one selected physical operation by analyzing the mapping information based on the first and second machine types to identify one or more physical operations of the second machine that the first work machine is authorized to adjust.

7. The system of claim 1, wherein the first and second machines are different types of machines, and the at least one selected physical operation varies based on the type of each of the first and second machine.

8. The system of claim 1, wherein the second machine includes the mapping information and determines at least one selected physical operation from the first set of physical operations that may be adjusted by the second machine based on the mapping information.

9. The system of claim 1, wherein the first machine is operated by a first operator having a first profile included in the first machine identifier information and the second machine is operated by a second operator having a second profile included in the second machine identifier information.

10. The system of claim 1, wherein the machine mapping information correlates a first machine operator to a second machine operator to determine the at least one selected physical operation that may be adjusted by the first machine.

11. The system of claim 1, wherein the first machine is configured to adjust the at least one selected physical operation of the second machine while performing at least one of the first set of physical operations.

12. The system of claim 11, wherein the second machine is configured to perform one or more of the second set of physical operations while the first machine adjusts the at least one selected physical operation.

13. A method for controlling operations of machines, comprising:
   determining a first type of first machine performing a set of first physical operations in a work environment;
   determining a second type of second machine performing a set of second physical operations in the work environment;
   determining a selected physical operation from the set of second physical operations that the first machine can control by analyzing mapping information that includes the first machine type and the second machine type and correlates the first machine type, the second machine type, and one or more physical operations of the set of second physical operations; and
   adjusting, by the first work machine, the selected second physical operation while the first machine performs the set of first physical operations.

14. The method of claim 13, further including:
   communicating first machine identifier information from the first machine to the second machine; and
   communicating second machine identifier information from the second machine to the first machine,
   wherein the first machine identifier information identifies the first type of the first machine and the second machine identifier information identifies the second type of the second machine.

15. The method of claim 13, wherein the mapping information further correlates the first and second machine types to an operator profile for a first operator of the first machine and a second operator profile for a second operator of the second machine.

16. The method of claim 15, wherein determining the selected second physical operation includes:
   determining the selected second physical operation based on the first and second type of the first and second machines, respectively, and the first and second operator profiles.

17. The method of claim 16, wherein the first and second operator profile includes data reflecting experience levels for the respective first and second operators.

18. The method of claim 13, wherein determining the selected second physical operation includes:
- determining whether the first machine includes mapping information that correlates the first machine type to the second machine type used to determine the selected physical operation; and
- receiving the mapping information from at least one of an off-board system and a remote machine in the event the first machine does not include the mapping information.

19. The method of claim 13, further including:
- receiving, by the first machine from a remote machine, a request message for the mapping information; and
- sending the mapping information to the remote machine.

20. The method of claim 13, further including:
- receiving, by the first machine from a remote machine, an operation request message for determining physical operations of an identified machine that can be controlled by the remote machine;
- determining a selected physical operation of the identified machine that the remote machine can control; and
- sending a message identifying the determined selected physical operation to the remote machine.

21. The method of claim 20, wherein determining the selected physical operation of the identified machine that the remote machine can control includes:
- analyzing mapping information that correlates the first machine type, the second machine type, a remote machine type and an identified machine type.

22. The method of claim 13, wherein determining the selected physical operation is performed by one of:
- the first machine;
- the second machine;
- an off-board system; and
- a third machine.

23. A system in a first machine performing first physical operations, comprising:
- a memory including a data structure storing mapping information that includes a correlation of machine types of a first and second machine to physical operations of the first and second machines; and
- a processor configured to receive identifier information from a second machine reflecting at least the type of the second machine and configured to analyze the data structure based on the identifier information to determine a selected physical operation of the second machine that the first machine is authorized to control,
- wherein the first machine is configured to control the selected physical operation of the second machine while performing the first physical operations.

24. A system for controlling operations of machines, comprising:
- means for determining a first type of first machine performing first physical operations in a work environment;
- means for determining a second type of second machine performing second physical operations in the work environment;
- means for determining a selected second physical operation that the first machine can control based on the first and second type of the first and second machines, respectively, and based on an operator profile of the operator of the first machine and an operator profile of the operator of the second machine; and
- means for adjusting, in the first machine, the selected second physical operation while the first machine performs the first physical operations.

* * * * *

UNITED STATES PATENT AND TRADEMARK OFFICE
CERTIFICATE OF CORRECTION

PATENT NO. : 7,398,137 B2
APPLICATION NO. : 10/924908
DATED : July 8, 2008
INVENTOR(S) : Alan Ferguson Page 1 of 1

It is certified that error appears in the above-identified patent and that said Letters Patent is hereby corrected as shown below:

Please correct the Claims as follows:
Column 14, line 42, in Claim 13, after "selected" delete "second".

Column 15, line 2, in Claim 18, after "selected" delete "second".

Signed and Sealed this

Twenty-fourth Day of February, 2009

JOHN DOLL
*Acting Director of the United States Patent and Trademark Office*